United States Patent [19]

Kaufmann

[11] 4,346,260

[45] Aug. 24, 1982

[54] METHOD AND APPARATUS TO CONTROL A DRAWING MACHINE ATTACHED TO A COMPUTER BY MEANS OF A DIGITIZING DEVICE

[75] Inventor: Rainer Kaufmann, Hamburg, Fed. Rep. of Germany

[73] Assignee: Aristo Graphic Systeme GmbH & Co., Hamburg, Fed. Rep. of Germany

[21] Appl. No.: 161,476

[22] Filed: Jun. 20, 1980

[30] Foreign Application Priority Data

Jun. 25, 1979 [DE] Fed. Rep. of Germany ....... 2925613

[51] Int. Cl.³ ........................ G06F 3/08; G06K 15/20

[52] U.S. Cl. ....................................... 178/18; 33/1 M

[58] Field of Search .................... 178/18, 19; 364/900, 364/520; 250/329, 202, 557, 558, 549, 216, 578; 340/707; 33/1 M; 350/342; 346/33 R, 34; 354/4

[56] References Cited

U.S. PATENT DOCUMENTS 3,567,852 3/1971 Ett .
3,651,509 3/1972 Ngo .
3,758,717 9/1973 Granzotti .
3,781,846 12/1973 Eichelberger et al. .
3,873,769 3/1975 Cotter .................................. 178/18
3,917,955 11/1975 Inuiya .
3,973,245 8/1976 Belser .
4,110,014 8/1978 Yevick .
4,139,803 2/1979 Kurahaphi et al. .
4,177,354 12/1979 Mathews .

*Primary Examiner*—Thomas A. Robinson
*Attorney, Agent, or Firm*—David H. Semmes; Warren E. Olsen

[57] ABSTRACT

An improved method for controlling a drawing machine of the type that is connected to a computer by means of a digitizing device, and comprises a sensor plate and sensor. The method comprises the steps of horizontally projecting an image, from the drawing table surface, through the back side of a translucent sensor plate, and thereby reproducing said image conformably upon the front side thereof as a drawing field, which thereby comprises a screen upon which a digitizing sensor is operable to be employed. There is also taught an important device for controlling a drawing machine of the type that is connected to a computer by means of a sensor plate, containing therewithin a sensor field track, for sensing the position of an associated sensor. The improved device comprises a projector that is adapted to focus an image from a drawing table surface upon a drawing field surface of a sensor plate which is translucent, and contains the sensor field track. The device thereby forms a drawing field which is visible on the upper side of said sensor plate, to enable following thereof by the sensor.

10 Claims, 2 Drawing Figures

METHOD AND APPARATUS TO CONTROL A DRAWING MACHINE ATTACHED TO A COMPUTER BY MEANS OF A DIGITIZING DEVICE

BACKGROUND OF THE INVENTION

1. Field of the Invention

The invention concerns a method, and a device for its implementation, for controlling a drawing machine that is connected to a computer, by means of a digitizing device which essentially comprises a sensor plate and sensor.

2. Description of the Prior Art

Conventionally, a cathode ray tube has been used for the presentation of digitizing field information, wherein a cartesian coordinate identification is by means of cross wires or a cursor. Such systems are not very well suited in design as has been shown in practice for large graphic communication, since the cathode tube working surface is too small and the resulting resolution is not adequate. Another disadvantage is the relatively high investment costs for a given work station, and the fact that the resulting work at a design engineer's station is not what is usually found in practice and lacks connection with the normal routine activities.

SUMMARY OF THE INVENTION

The object of the present invention is to create an improved method, and a device to practice that method, to reduce the investment costs and simplify the operation connected with the creation of a large scale graphics input field, with high resolution, as noted hereinabove.

The above-mentioned object is achieved according to the invention as defined in the appended claims. According to the present invention, a drawing machine projects the picture information from behind, and onto the drawing field by means of a projection device wherein the sensor surface of the digitizing device is translucent.

According to the method taught by the invention, and the device taught according to the invention, all commands and geometric directions can thereby be introduced by the sensor or digitizing pen without the drawing machine itself influencing the operation, as is the case at this time with customary combined digitizing and drawing machines.

One particular resulting advantage is that the picture information, as drawn with the computer-controlled drawing machine, can be partially erased again, at any time, by the drawing machine itself, since the drawing head of the associated drawing machine may be provided with eraser pens, or with writing and drawing pens containing erasable ink.

The projection of picture information to the top side of the translucent sensor plate can be done in different ways. It is possible to arrange an overhead projector above the drawing table, whose picture information is then projected by mirrors, through the bottom side of the sensor plate, and onto the upper or drawing field. Thus, the drawing field can be constructed either as a ground glass screen or as a holder for a translucent drawing support.

It is also possible to make the drawing table of the drawing machine translucent so that a light source can be disposed beneath the drawing table, to shine through the drawing table surface and project the picture information upon the drawing field, through a lens and mirror arrangement.

Further details, features and objects of the invention are given in the following detailed description, wherein the drawings show two preferred embodiments of the invention, in a schematic fashion.

DETAILED DESCRIPTION OF THE PREFERRED EMBODIMENTS

Figure 1:
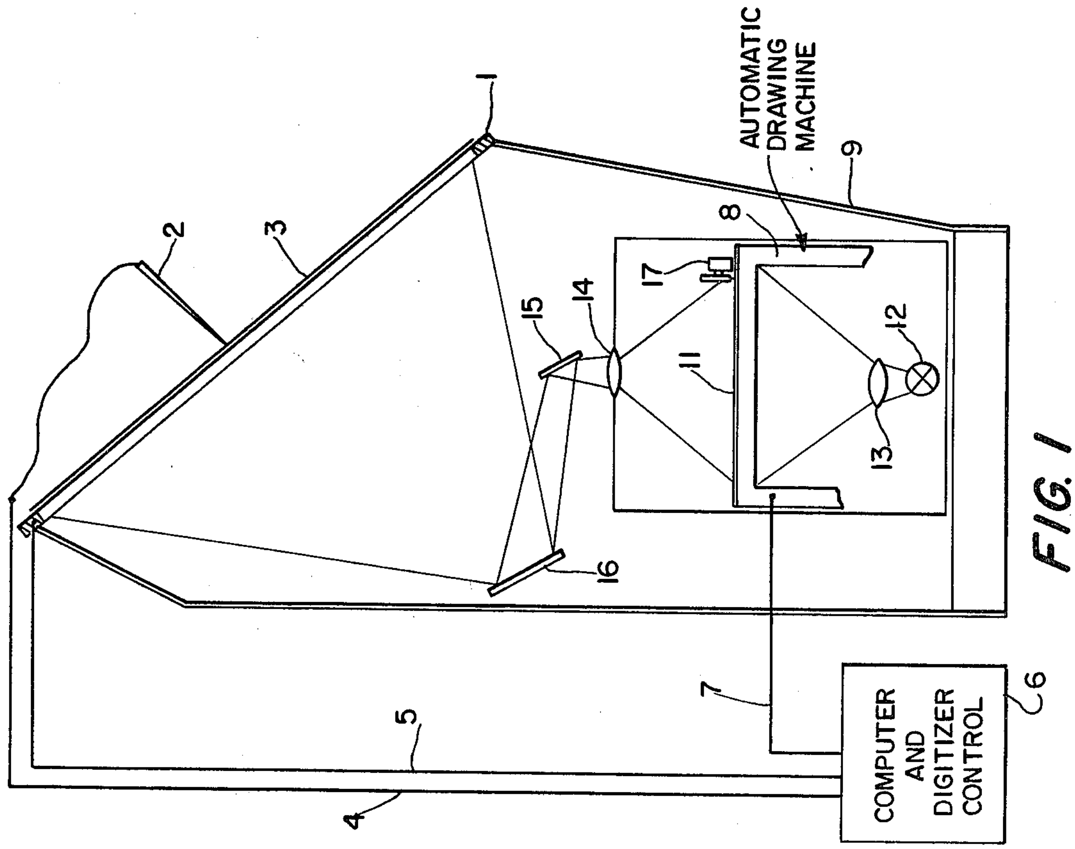
FIG. 1 shows schematically a cutaway, side view of a drawing station with computer-controlled drawing machine and a digitizing device.

The design or drawing station embodiment shown in FIG. 1 has a working surface formed by a sensor plate that is attached thereto at an angle. The sensor plate 1 is translucent and contains a sensor field track, as is customary for such structures. A digitizing pen 2 is shown upon the drawing field 3 of the sensor plate 1. Optionally, of course, the pen could be replaced by a cross-wire sensor. The sensor plate 1 and the digitizing pen 2 are connected to the computer 6 by leads 4 and 5, which also control the actual drawing machine 8 through lead 7, in a conventional relation, as shown, for example, by the digitizing sensor, computer and drawing machine interrelationships illustrated in U.S. Pat. No. 3,873,769 in the name of Cotter. The drawing machine 8 is shown located below the sensor plate 1, and within the device housing 9.

In the FIG. 1 embodiment both the drawing table surface 11 of the drawing machine 8 and the sensor plate 1 are translucent. A light source 12 is located below the drawing table surface 11 with a lens 13 which focuses light through the translucent drawing table surface 11. Thusly, the illuminated picture on the drawing table surface 11 is then projected, by a lens 14 and associated inversion mirrors 15 and 16, onto drawing field 3 upon which the projector assembly, consisting of parts 12 through 16, is focused. The drawing field can be either a ground glass screen or it can be so constructed that a translucent drawing support is attached on the drawing field 3, to thereby form the drawing field screen itself.

Of course, the embodiment illustrated in FIG. 1, in combination with the digitizing pen 2, conventionally requires further switching equipment in order to control the computer 6 and to activate the drawing machine 8, as is known in this art.

Figure 2:
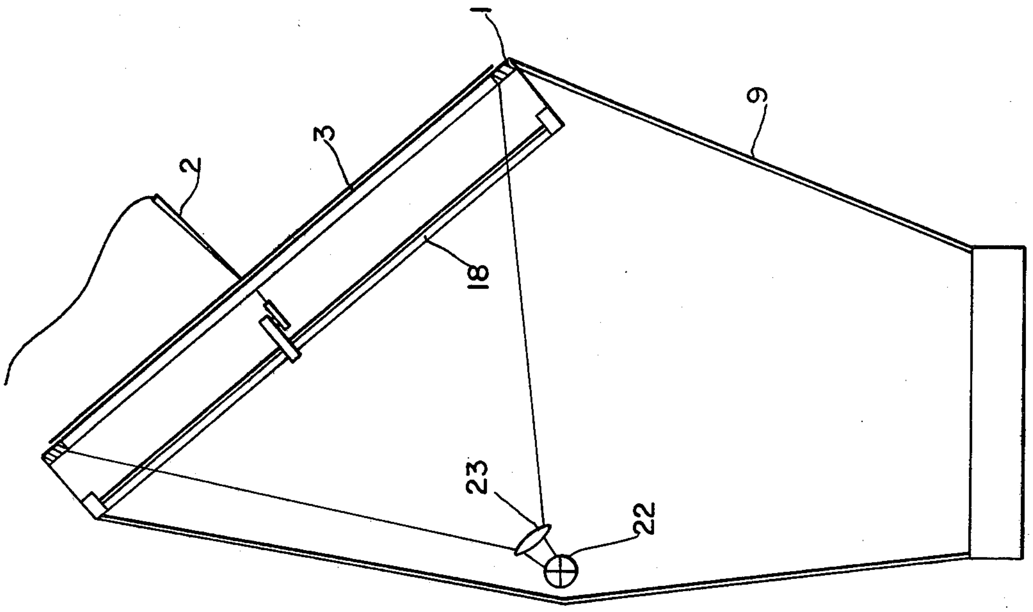
FIG. 2 shows a second embodiment of the invention of FIG. 1, in similar schematic presentation, wherein the drawing table of the drawing machine is arranged upon a plane which is parallel to that of the digitizing device.

The second embodiment schematically shown in FIG. 2 differs from the embodiment of FIG. 1, described above, in the fact that the table of the drawing machine referred to by number 18 in FIG. 2 is disposed in a plane which is parallel and below the sensor plate 1. Such an arrangement makes it possible to eliminate the inversion mirrors and makes it possible to project the image produced by the drawing machine 18 directly onto the drawing field 3 of the sensor plate 1 by the illustrated light source 22 and a corresponding lens 23. If desired, the drawing machine 18 illustrated could also be constructed so that it would draw upon the bottom side of the angled table surface of the drawing machine 18.

Further explanation for the FIG. 2 embodiment appears to be unnecessary, since the operation, and interconnection to a control computer, are equivalent to that shown in FIG. 1.

With reference to FIG. 1, it should also be mentioned that the drawing machine 8 can also have a nontranslucent drawing table. In this case an episcope, or overhead projector, may be used in the place of the slide projector lens, as is illustrated in FIG. 1. This projector may illuminate the top side of the drawing table 11 and this illuminated picture may then be projected on the drawing field 3 of the sensor plate by mirrors.

It is further contemplated that, in addition to drawing and writing pens containing erasable ink, the drawing head of the drawing machine can also be provided with eraser pens, to enable the drawings to be corrected immediately.

If the drawing machine employed is a light drawing device, of the known type illustrated by U.S. Pat. No. 3,848,520 in the name of Gerber, which is known to work with a light head and photosensitive paper, there is also the possibility of correcting a drawing immediately, and directly, if the light drawing head is made to work with varying wave lengths. For example, the first group of wave lengths may be used to draw and the second group of wave lengths may be used to erase.

Another correction possibility for the drawing machine is realized by constructing the drawing table surface as a glass plate, with a light-absorbing coating. A stylus in the drawing head can then be used to scratch the coating and a writing pen in the writing head can thereafter be used to completely cover the scratched lines again, as desired.

In order to prevent the longitudinal and transverse carriages of the drawing machine 8 from blocking the projection of the drawing table surface onto the drawing field 3 the carriage control can be made automatic so that in the intervals when the drawing machine 8 is not drawing the longitudinal and transverse carriages can be moved to a side position where they do not block the projection.

The preferred embodiments of the invention illustrated are not limiting, and my invention is to be defined by the scope of the appended claims.

I claim:

1. In a method for controlling a drawing machine having a horizontal table surface and a carriage means to move a drawing head that is controlled by a computer which receives inputs from a digitizing device which further comprises a sensor plate and sensor, the improvement which comprises the steps of optically projecting an image of the horizontal drawing table surface through the back side of a translucent sensor plate which is spaced thereabove, and thereby reproducing an image of said drawing table surface conformably upon the front side of said plate as a drawing field, to thereby define a screen upon which a digitizing sensor is operable to be employed, and in turn supply inputs to said computer to control said drawing head.

2. The method according to claim 1, further including the step of moving longitudinal or transverse carriages of the drawing machine carriage to a side position in response to a signal from the attached computer for the intervals in which the drawing head of said carriage is not drawing, in which position the carriage does not block the horizontal projection on the drawing table.

3. In a device for controlling a drawing machine that is controlled by a computer which receives imputs from a digitizing device which further comprises a sensor plate containing therewithin a sensor field track, and is operable for sensing the position of an associated sensor positioned thereover, the improvement which comprises a projector means (12, 13, 22, 23) that is adapted optically to focus an image from a horizontally disposed drawing table surface upon the lower side of a drawing field surface (3) of a sensor plate (1) which is translucent, and contains said sensor field track, to thereby form an image of said drawing table surface as a drawing field which is visible on the upper side of said sensor plate, to enable following thereupon by the sensor, thereby to supply inputs to said computer to control a drawing head positioned upon a carriage over said drawing table.

4. An improved device according to claim 3, wherein said translucent sensor plate (1) further comprises a ground glass screen on its upper surface.

5. An improved device according to claim 3, wherein said translucent sensor plate (1) further comprises an upper surface which acts as a base for a translucent drawing support.

6. An improved device according to any of claims 3, 4 or 5, characterized further in that said projector means further comprises an overhead projector (14) which is disposed between the drawing table upper surface (11) and the sensor plate (1).

7. An improved device according to claim 6, wherein an inversion mirror (15) is disposed in the path of the light rays generated by said overhead projector (14).

8. An improved device according to either of claims 3, 4 or 5, wherein said drawing table surface (11) is translucent and said projector further comprises a light source (12) which is disposed beneath the drawing table surface (11), and further there is a lens (14) disposed between the drawing table surface (11) and said sensor plate (1).

9. An improved device according to claim 8, wherein further said drawing machine is disposed so that said drawing table surface is parallel, and proximate the backside of said sensor plate (1).

10. An improved device according to claims 3, 4 or 5, wherein further said drawing machine (8) is the type comprising photo-sensitive drawing supports, and further said drawing machine is provided with a light drawing head.

* * * * *